United States Patent [19]
Lew

[11] Patent Number: 4,884,473
[45] Date of Patent: * Dec. 5, 1989

[54] DUAL EPICYCLIC SPEED CHANGER

[76] Inventor: Hyok S. Lew, 7890 Oak St., Arvada, Colo. 80005

[*] Notice: The portion of the term of this patent subsequent to Jun. 27, 2006 has been disclaimed.

[21] Appl. No.: 153,961

[22] Filed: Feb. 9, 1988

Related U.S. Application Data

[63] Continuation-in-part of Ser. No. 12,679, Feb. 9, 1987, Pat. No. 4,841,810, and a continuation-in-part of Ser. No. 29,521, Mar. 23, 1987, Pat. No. 4,762,025.

[51] Int. Cl.⁴ ............................................. F16H 1/28
[52] U.S. Cl. ..................................................... 74/804
[58] Field of Search ................................. 74/804, 805

[56] References Cited
U.S. PATENT DOCUMENTS

| | | | |
|---|---|---|---|
| 627,383 | 6/1899 | Birrell | 74/805 |
| 987,430 | 3/1911 | Conaut | 74/805 |
| 1,658,767 | 2/1928 | Hall | 74/805 |
| 3,472,097 | 10/1969 | Huska | 74/804 X |
| 4,050,331 | 9/1977 | Braren | 74/804 |
| 4,338,831 | 7/1982 | Rodaway | 74/805 |
| 4,621,543 | 11/1986 | Gabilondo | 74/804 X |

Primary Examiner—Dirk Wright

[57] ABSTRACT

The epicyclic speed changer of the present invention comprises a pair of rotary members respectively mounted on two eccentric sections included in a first shaft in a diametrically opposing arrangement, wherein the rotating movements of the two rotary members are coupled to one another as the two sets of positive meshing elements such as gear teeth respectively belonging to the two rotary members engage each other. One of the two rotary members is non-rotatably coupled to the stationary frame of the speed changer in a radially shiftable arrangement, while the other of the two rotary members is nonrotatably coupled to a second shaft in a radially shiftable arrangement. The rotation of the first shaft generates nonrotating orbiting motions for the one of the two rotary members and rotating orbiting motions for the other of the two rotary members wherein the rotating portion of the rotating orbiting motion is transmitted to the second shaft.

14 Claims, 2 Drawing Sheets

DUAL EPICYCLIC SPEED CHANGER

This patent application is a continuation-In-Part application to U.S. patent applications Ser. No. 07/012,679 entitled "Dual orbiting gear planetary drive" filed on Feb. 9, 1987 now U.S. Pat. No. 4,841,810 and Ser. No. 07/029,521 entitled "All orbiting gear planetary drive" filed on Mar. 23, 1987 now U.S. Pat. No. 4,762,025.

The epicyclic speed changer of the present invention comprises a pair of rotary members respectively mounted on two eccentric sections included in a first shaft in a diametrically opposing arrangement, wherein the rotating movements of the two rotary members are coupled to one another as the two sets of positive meshing elements such as gear teeth respectively belonging to the two rotary members engage each other. One of the two rotary members is nonrotatably coupled to the stationary frame of the speed changer in a radially shiftable arrangement, while the other of the two rotary members is nonrotatably coupled to a second shaft in a radially shiftable arrangement. The rotation of the first shaft generates nonrotating orbiting motions for the one of the two rotary members and rotating orbiting motions for the other of the two rotary members wherein the rotating portion of the rotating orbiting motion is transmitted to the second shaft. The epicyclic speed changer of the present invention providing a very high speed change ratio comprises three rotary members; a first rotary member with a first set of meshing elements mounted on a first eccentric section of the first shaft, a second rotary member with a second and third set of meshing elements mounted on a second eccentric section disposed diametrically opposite to the first eccentric section, and a third rotary member with a fourth set of meshing elements mounted on a third eccentric section of the first shaft disposed diametrically opposite to the second eccentric section, wherein the first and second set of meshing elements engage each other and the third and fourth set of meshing elements engage each other. The first rotary member is nonrotatably coupled to a second shaft in a radially shiftable arrangement, while the third rotary member is nonrotatably coupled to a stationary frame of the speed changer in a radially shiftable arrangement.

In conventional epicyclic gear reducers, an orbiting gear mounted on an eccentric section of the input shaft engages a stationary gear disposed concentric to the input shaft, wherein the rotating motion of the orbiting gear is transmitted to an output shaft by a mechanical coupling nonrotatably coupling the orbiting gear to the output shaft in a radially shiftable arrangement. It is imperative to keep the eccentric dimension defining the orbiting radius at a very small value not only to accomplish a high speed reduction but also to limit the rotating and orbiting velocities of the orbiting gear to very low values. Otherwise, the epicyclic gear reducer self destructs due to the high wear and tear resulting from the high speed movements of the orbiting gear. Indeed, the beauty of the epicyclic gear reducer is in the theory that the high speed rotation of the input shaft can be reduced to the low speed motion of the orbiting gear without employing any gear rotating at the high speed of the input shaft, which theory requires the orbiting radius of a very small value. In actual practice, the theory of the epicyclic gear reducer has not scored much success, because a deadly gear teeth interference problem takes place as soon as the orbiting radius of small value is employed. In many existing epicyclic gear reducers, this deadly gear teeth interference problem has been addressed by employing exotic gear teeth designs, which have provided some success at the cost of strength and economy of the gear reducers.

The primary object of the present invention is to provide an epicyclic speed changer of very small orbiting radius that does not have the gear teeth interference problem.

Another object is to provide an epicyclic speed changer of very high speed change ratios.

A further object is to provide an epicyclic speed changer of a simple and compact design providing a high power transmission capacity.

Yet another object is to provide an epicyclic speed changer with a built-in clutch.

Yet a further object is to provide an epicyclic speed changer comprising two rotary members respectively mounted on two eccentric sections of a first shaft or an input member disposed in a diametrically opposing arrangement and two sets of meshing elements respectively included in two rotary members engaging each other, wherein one of the two rotary members is nonrotatably coupled to a stationary member or a rotatable member with braking means in a radially shaftable arrangement, while the other of the two rotary members is nonrotatably coupled to a second shaft or an output member in a radially shaftable arrangement.

Still another object is to provide an epicyclic speed changer comprising a first rotary member with a first set of meshing elements mounted on a first eccentric section of a first shaft or input member, a second rotary member with a second and third set of meshing elements mounted on a second eccentric section disposed in a diametrically opposing arrangement to the first eccentric section, and a third rotary member with a fourth set of meshing elements mounted on a third eccentric section of the first shaft or input member disposed in a diametrically opposing arrangement to the second eccentric section, wherein the first and second set of meshing elements engage each other and the third and fourth set of meshing elements engage each other. The third rotary member is nonrotatably coupled to a stationary member or rotatable member with braking means in a radially shiftable arrangement, while the first rotary member is nonrotatably coupled to a second shaft or an output member in a radially shaftable arrangement.

These and other objects of the present invention will become clear as the description thereof progresses. The present invention may be described with a great clarity and specificity by referring to the following figures.

Figure 1:
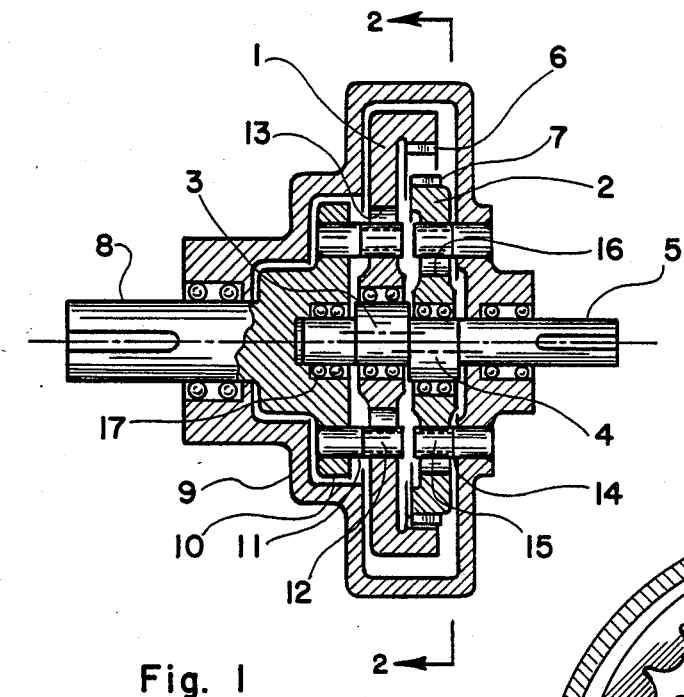
FIG. 1 illustrates an embodiment of the epicyclic speed changer of the present invention.

In FIG. 1 there is illustrated an embodiment of the epicyclic speed changer of the present invention, which comprises a first and second rotary members 1 and 2, respectively mounted rotatably on two eccentric sections 3 and 4 included in a first shaft or input member 5, which eccentric sections are disposed in a diametrically opposing arrangement. The first rotary member 1 includes a set of meshing elements 6 such as a set of internal gear teeth, while the second rotary member 2 includes a set of meshing elements 7 such as a set of external gear teeth, wherein the two sets of meshing elements or gear teeth engage each other. The second shaft or output member 8 is disposed in line with the first shaft 5, wherein both shafts are supported by the frame 9 of the speed reducer in a rotatable arrangement. The first rotary member 1 is nonrotatably coupled to the flange 10 of the second shaft 8 in a radially shiftable arrangement by a coupling 11 comprising a plurality of posts 12 extending from the flange 10 and respectively engaging a plurality of oversized holes 13 included in the hub of the first rotary member 1. The second rotary member 2 is nonrotatably coupled to the frame 9 in a radially shiftable arrangement by a coupling 14 comprising a plurality of posts 15 extending from one end plate of the frame 9 and respectively engaging a plurality of oversized holes 16 included in the hub of the second rotary member 2. The bearing 17 rotatably supporting the extremities of the first and second shafts 5 and 6 provides stability for the rotating motions thereof.

Figure 2:
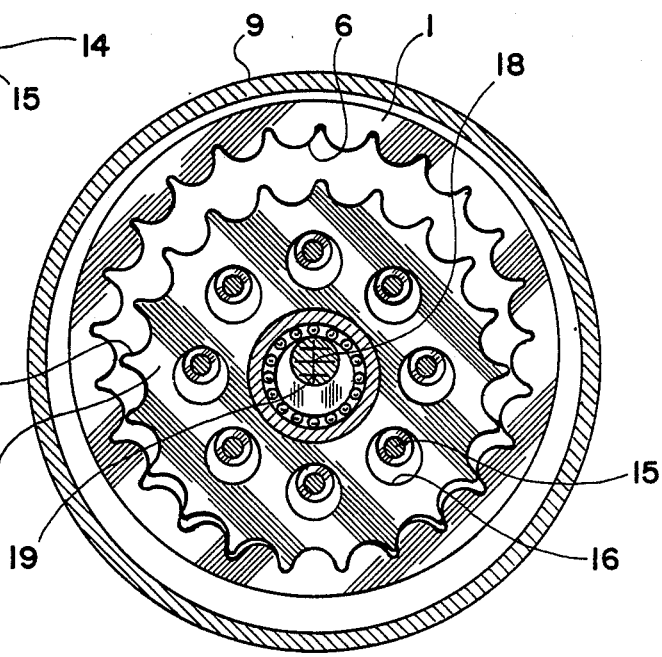
FIG. 2 illustrates a cross section of the embodiment shown in FIG. 1.

In FIG. 2 there is illustrated a cross section of the embodiment shown in FIG. 1, which cross section is taken along plane 2—2 as shown in FIG. 1. The first and second rotary members 1 and 2 are coupled to one another by the two sets of meshing elements or gear teeth 6 and 7 engaging each other. The coupling 14 connecting the second rotary member 2 to one end plate of the frame 9 in a nonrotating and radially shiftable arrangement comprises a plurality of posts 15 with sleeve bearings axially extending from one end plate of the frame 9 in an axisymmetric arrangement about the central axis of the first shaft or input member 18, which posts engage a plurality of oversized holes 16 disposed through the hub of the second rotary member 2 in an exisymmetric arrangement about the central axis 19 of the eccentric section 4. The coupling 11 connecting the first rotary member 1 to the flange 10 of the second shaft 8 in a nonrotatable and radially shiftable arrangement has the construction similar to the coupling 14 detailed in FIG. 2.

The epicyclic gear reducer illustrated in FIGS. 1 and 2 operates on the following principles: The rotation of the first shaft 5 creates on orbiting motion of the first rotary member 1 about the central axis of the first shaft 5. Since the first rotary member 1 is under meshing engagement with the second rotary member 2 that is not allowed to rotate, the orbiting motion of the first rotary member generates the rotating motion thereof about its own central axis just like a roller rolling on an inner cylindrical surface of a circular cylindrical shell. The rotating motion of the first rotary member 1 is transmitted to the second shaft 8 by the radially shiftable coupling 11. The eccentric dimension of each of the two eccentric sections 3 and 4 can be a very small value without creating the problem of gear teeth interference, for the separation distance between the centers of the two rotary members 1 and 2 is equal to two times the eccentric dimension and the maximum distance between the pitch circles of the two sets of meshing elements is equal to four times the eccentric dimension. It should be mentioned that the nonrotatable and radially shiftable couplings employed in the epicyclic speed changers of the present invention can be other types than the particular couplings illustrated in FIGS. 1 and 2, which may include many different shaft coupling designs such as flex couplings, misalignment couplings, universal couplings, clearance spline couplings, etc. The gear teeth are only one of many types of meshing elements usable in conjunction with the epicyclic speed changers of the present invention, which types may include rollers and sprocket teeth, balls and sockets, as well as other combinations.

Figure 3:
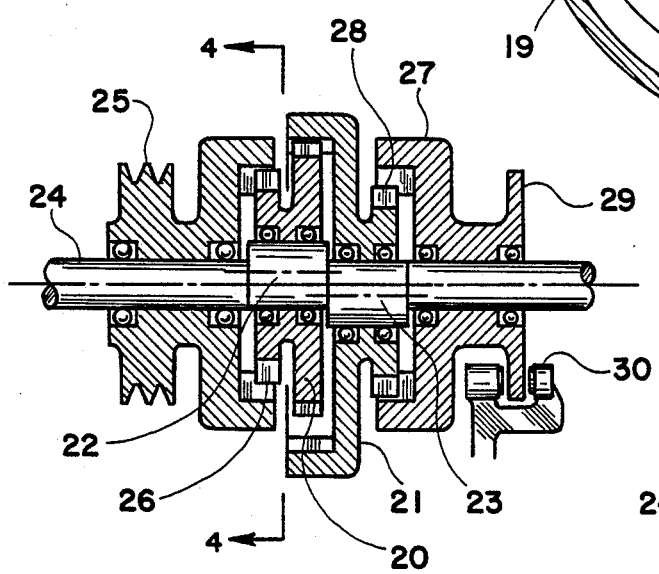
FIG. 3 illustrates another embodiment of the epicyclic speed changer of the present invention.

In FIG. 3 there is illustrated another embodiment of the epicyclic speed changer of the present invention, which comprises two rotary members 20 and 21 respectively mounted rotatably on two eccentric sections 22 and 23 included in a first shaft 24. The first rotary member 20 is coupled to a V-belt drum or output member 25 in a nonrotatable and radially shiftable arrangement by a first clearance spline coupling 26, while the second rotary member 21 is coupled to a rotatable member 27 mounted on the first shaft 24 in a nonrotatable and radially shiftable arrangement by a second clearance spline coupling 28. The rotatable member 27 includes a brake means comprising a disc 29 and a caliper actuator 30. When the brake is activated, the rotating motion of the first shaft 24 is transmitted to the output member 25 at a changed speed. When the brake is deactivated, the rotating motion of the first shaft 24 is bypassed to the rotatable member 27 and, consequently, the output member 25 receives zero power transmission. It is now clear that the embodiment of the epicyclic speed changer shown in FIG. 3 has a built-in clutch. It is also clear that the embodiment shown in FIG. 1 can be readily modified to include a built-in clutch.

Figure 4:
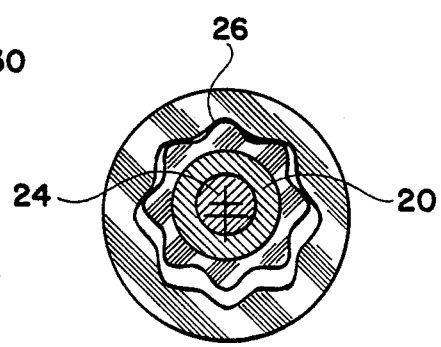
FIG. 4 illustrates a cross section of the embodiment shown in FIG. 3.

In FIG. 4 there is illustrated a cross section of the embodiment shown in FIG. 3, which cross section, taken along plane 4—4 as shown in FIG. 3, illustrates the cross section of the clearance spline coupling 26, which couples the first rotary member 20 to the output member 25 in a nonrotatable and radially shiftable arrangement.

Figure 5:
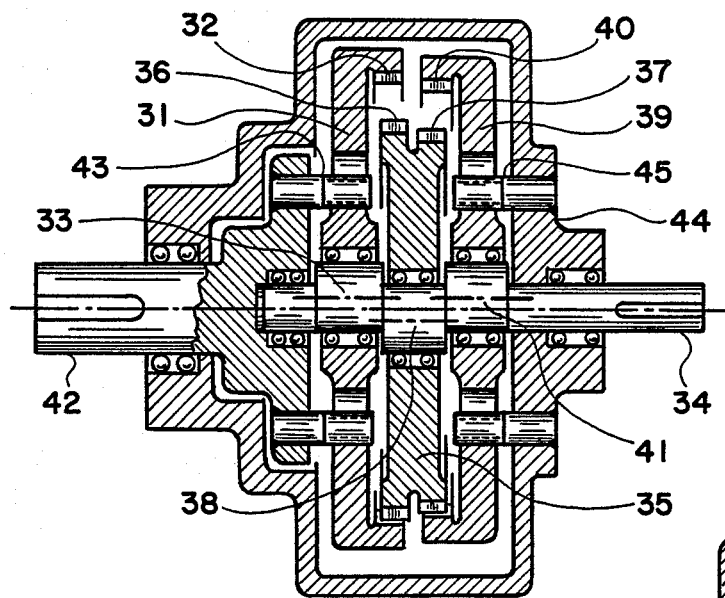
FIG. 5 illustrates an embodiment of the epicyclic speed changer of the present invention providing a very high speed change ratio.

In FIG. 5 there is illustrated an embodiment of the epicyclic speed changer of the present invention providing a very high speed change ratio, which comprises a first rotary member 31 with a first set of meshing elements 32 rotatably mounted on a first eccentric section 33 of a first shaft 34, a second rotary member 35 with a second and third set of meshing elements 36 and 37 rotatably mounted on a second eccentric section 38 disposed in a diametrically opposing arrangement to the first eccentric section 33, and a third rotary member 39 with a fourth set of meshing elements 40 rotatably mounted on a third eccentric section 41 of the first shaft 34 disposed in a diametrically opposing arrangement to the second eccentric section 38. The first and second set of meshing elements engage each other, and the third and fourth set of meshing elements engage each other.

The first rotary member 31 is coupled to a second shaft or output member 42 in a nonrotatable and radially shiftable arrangement by a first nonrotatable and radially shiftable coupling 43, while the third rotary member 39 is coupled to the stationary frame 44 in a nonrotatable and radially shiftable arrangement by a second nonrotatable and radially shiftable coupling 45. The epicyclic speed changer shown in FIG. 5 provides unlimited values of speed change ratios, which is evidenced by the fact that no rotating motion is transmitted from the input shaft 34 to the output shaft 42 when the pitch diameters of the second and third set of the meshing elements included in the second rotary member 35 are the same. Different types of the meshing elements, and the nonrotatable and radially shiftable couplings mentioned in conjunction with the operating principles of the embodiment shown in FIG. 1 may replace the particular corresponding elements included in the embodiment shown in FIG. 5.

Figure 6:
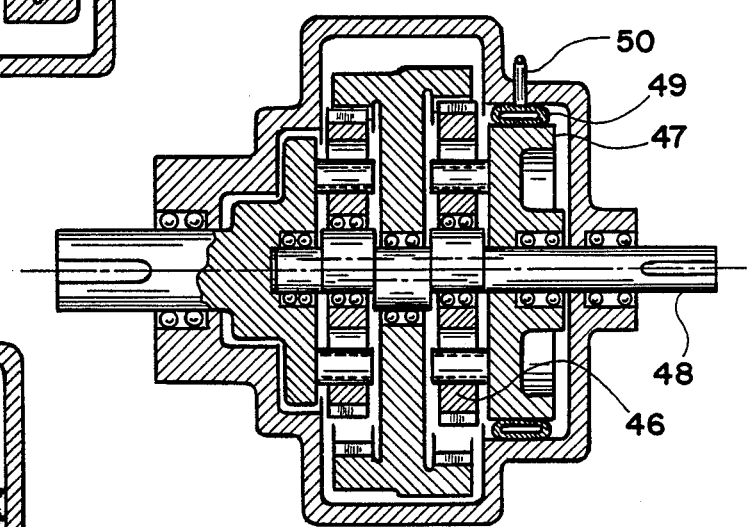
FIG. 6 illustrates another embodiment of the epicyclic speed changer of the present invention providing a very high speed change ratio.

In FIG. 6 there is illustrated another embodiment of the epicyclic speed changer of the present invention providing a very high speed change ratio, which has essentially the same construction as the embodiment shown in FIG. 5 with two exceptions. Firstly, the sets of internal gear teeth employed in FIG. 5 are now replaced by sets of external gear teeth and the sets of external gear teeth included in FIG. 5 are now replaced with sets of internal gear teeth. Secondly, the third rotating member 46 is now coupled nonrotatably and radially shiftably to a rotatable member 47 rotatably mounted on the first shaft 48 instead of the stationary frame of the speed changer, wherein the rotatable member 47 includes a brake means comprising an inflatable tube 49 with air valve 50, which combination provides a built-in clutch for the embodiment shown in FIG. 6. It is clear that the embodiment shown in FIG. 5 can be readily modified to include a built-in clutch by incorporating the built-in clutch arrangement shown in FIG. 3 or 6.

Figure 7:
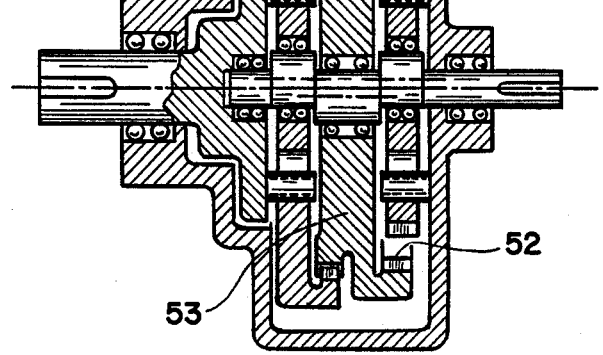
FIG. 7 illustrates a further embodiment of the epicyclic speed changer of the present invention providing a very high speed change ratio.

In FIG. 7 there is illustrated a further embodiment of the epicyclic speed changer of the present invention providing a very high speed change ratio, which has essentially the same construction as the embodiment shown in FIG. 4 or 5 with one exception being that the second and third sets of meshing elements 51 and 52 included in the second rotary member 53 now employ a mixed combination of sets of internal and external gear teeth instead of the all internal or all external gear teeth. This embodiment can also be readily modified to include a built-in clutch as shown in the embodiment shown in FIG. 3 or 6.

Figure 8:
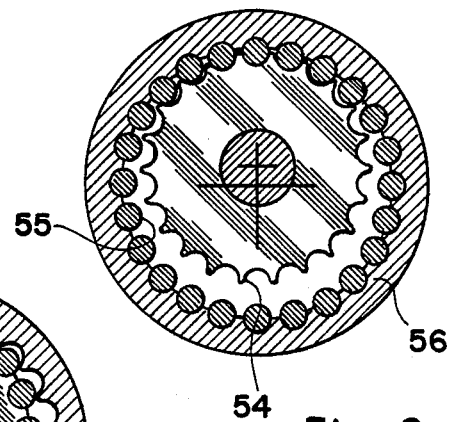
FIG. 8 illustrates an embodiment of the meshing elements usable in conjunction with the epicyclic speed changer of the present invention.

In FIG. 8 there is shown an illustrative embodiment of the combination of meshing elements, which can be employed in place of simple or modified gear teeth, which combination includes a set of external sprocket teeth 54 and a set of internal rollers 55. The internal roller are rotatably supported by a pair of flanges affixed to the two end faces of the rotary member 56, which flanges are not shown in FIG. 8.

Figure 9:
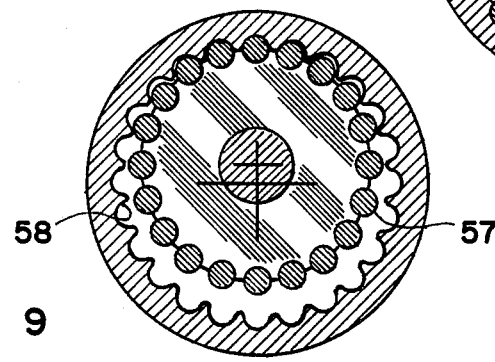
FIG. 9 illustrates another embodiment of the meshing elements usable in conjunction with the epicyclic speed changer of the present invention.

In FIG. 9 there is illustrated another illustrative embodiments of the combination of meshing elements, which comprises a set of external rollers 57 and a set of internal sprocket teeth 58. It should be pointed out that the patentability of the epicyclic speed changer of the present invention is in the combination wherein each pair of intermeshing rotary members are rotatably mounted on two eccentric sections of a shaft or input member disposed in a diametrically opposing arrangement whereby the maximum separation between the two pitch circles of the two sets of intermeshing elements is equal to four times the eccentric dimension of the individual eccentric section, and the rotating or nonrotating motion of the individual rotary member is coupled to the output member or stationary frame by a nonrotatable and radially shiftable coupling, which combination eliminates the deadly problem of gear teeth interference and thus makes it possible to employ a very small value of the eccentric dimension.

While the principles of the present invention have now been made clear by the illustrative embodiments, there will be immediately obvious to those skilled in the art many modifications of the structures, arrangements, proportions, elements and materials, which are particularly adapted to the specific working environments and operating conditions in the practice of the invention without departing from those principles. It is not desired to limit the inventions to the particular illustrated embodiments shown and described and, accordingly, all suitable modifications and equivalents may be resorted to falling within the scope of the inventions as defined by the claims which follow.

The embodiments of the invention, in which an exclusive property or priviledge is claimed, are defined as follows :

1. A mechanical speed changer comprising in combination :
    (a) frame;
    (b) a power output member of generally axisymmetric construction rotatably supported by the frame;
    (c) a shaft disposed in line with the power output member and rotatably supported by the frame; said shaft including a first and second eccentric section disposed in two generally opposing eccentric arrangements;
    (d) a first rotary member with a first set of meshing elements rotatably mounted on said first eccentric section of the shaft, wherein said first set of meshing elements is disposed in a concentric arrangement about the central axis of said first eccentric section of the shaft, and a plurality of circular holes with central axis parallel to the shaft disposed on a circle concentric to the central axis of said first eccentric section of the shaft;
    (e) a second rotary member with a second set of meshing elements rotatably mounted on said second eccentric section of the shaft, wherein said second set of meshing elements is disposed in a concentric arrangement about the central axis of said second eccentric section of the shaft, and a plurality of circular holes with central axis parallel to the shaft disposed on a circle concentric to the central axis of said second eccentric section of the shaft; wherein, said first and second sets of meshing elements engage each other over a portion of said concentric arrangement;
    (f) a plurality of circular cylindrical posts disposed on a circle concentric to the central axis of the shaft and rigidly affixed to a member nonrotatably secured to the power output member and respectively engaging the plurality of circular holes included in one of the first and second rotary members in a clearance relationship allowing orbiting motion of said one of the first and second rotary members about the central axis of the shaft, wherein the combination of the circular holes and the circular cylindrical posts provides a coupling that transmits rotating motion of said one of the first and second rotary members created by the orbiting motion thereof to the power output member; and (g) a plurality of circular cylindrical posts disposed on a circle concentric to the central axis of the shaft and rigidly affixed to a holder member supported by the frame and respectively engaging the plurality of circular holes included in the other of the first and second rotary members in a clearance relationship allowing orbiting motion of said the other of the first and second rotary member about the central axis of the shaft, wherein the combination of the circular holes and the circular cylindrical posts provides a coupling that disallows rotating motion of said the other of the first and second rotary member relative to said holder member;

2. The combination as set forth in claim 1 wherein said holder member is affixed to the frame.

3. The combination as set forth in claim 2 wherein said first and second sets of meshing elements comprise two sets of gear teeth engaging each other.

4. The combination as set forth in claim 2 wherein said first and second sets of meshing elements comprise a set of rollers and a set of sprocket teeth engaging each other.

5. The combination as set forth in claim 1 wherein said holder member is rotatably disposed and includes a braking means for preventing said holder member from rotating.

6. The combination as set forth in claim 5 wherein said first and second sets of meshing elements comprise two sets of gear teeth engaging each other.

7. The combination as set forth in claim 5 wherein said first and second sets of meshing elements comprise a set of rollers and a set of sprocket teeth engaging each other.

8. A mechanical speed changer comprising a combination:

(a) a frame;

(b) a power output member of generally axisymmetric construction rotatably supported by the frame in effect;

(c) a shaft disposed in line with the power output member and rotatably supported by the frame, said shaft including a first eccentric section, a second eccentric section disposed in a generally opposite eccentric arrangement to said first eccentric section, and a third eccentric section disposed in a generally opposite eccentric arrangement to said second eccentric section;

(d) a first rotary member with a first set of meshing elements rotatably mounted on said first eccentric section of the shaft, wherein said first set of meshing elements is disposed in a concentric arrangement about the central axis of said first eccentric section of the shaft;

(e) a second rotary member with a second and third set of meshing elements rotatably mounted on said second eccentric section of the shaft, wherein said second and third set of meshing elements are respectively disposed in a concentric arrangement about the central axis of said second eccentric section of the shaft, and said first and second set of meshing elements engage each other over a portion of said concentric arrangements thereof;

(f) a third rotary member with a fourth set of meshing elements rotatably mounted on said third eccentric section of the shaft, wherein said fourth set of meshing elements is disposed in a concentric arrangement about the central axis of said third eccentric section of the shaft, and said third and fourth set of meshing elements engage each other over a portion of said concentric arrangements thereof;

(g) a first coupling nonrotatably coupling one of the first and third rotary members to the power output member in a radially shiftable relationship therebetween whereby said first coupling transmits the rotating motion of said one of the first and third rotary members created by the orbiting motion thereof to the power output member; and (h) a second coupling nonrotatably coupling the other of the first and third rotary members to a holder member disposed coaxially about the central axis of the shaft in a radially shiftable relationship therebetween.

9. The combination as set forth in claim 8 wherein said holder member is affixed to the frame.

10. The combination as set forth in claim 9 wherein each pair of the sets of meshing elements engaging each other comprise two sets of gear teeth engaging each other.

11. The combination as set forth in claim 9 wherein each pair of the sets of meshing elements engaging each other comprise a set of rollers and a set of sprocket teeth engaging each other.

12. The combination as set forth in claim 8 wherein said holder member is rotatably disposed and includes a braking means for preventing said holder member from rotating.

13. The combination as set forth in claim 12 wherein each pair of the sets of meshing elements engaging each other comprise two sets of gear teeth engaging each other.

14. The combination as set forth in claim 12 wherein each pair of the sets of meshing elements engaging each other comprise a set of rollers and a set of sprocket teeth engaging each other.

* * * * *